United States Patent
Gomez De Las Heras Carbonell et al.

(10) Patent No.: US 8,680,700 B2
(45) Date of Patent: Mar. 25, 2014

(54) WIND TURBINE HAVING AN ACTIVE PITCH ANGLE CONTROL DURING AN IDLING SITUATION

(75) Inventors: Enrique Gomez De Las Heras Carbonell, Sarriguren (ES); Octavio Hernandez Mascarell, Sarriguren (ES); Jaime Suarez Aizpun, Sarriguren (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 310 days.

(21) Appl. No.: 13/279,599

(22) Filed: Oct. 24, 2011

(65) Prior Publication Data

US 2012/0104757 A1 May 3, 2012

(30) Foreign Application Priority Data

Oct. 29, 2010 (ES) ................................. 201001394

(51) Int. Cl.
*F03D 9/00* (2006.01)
*H02P 9/04* (2006.01)

(52) U.S. Cl.
USPC ............................................................ 290/44

(58) Field of Classification Search
USPC ..................................... 290/44, 55
See application file for complete search history.

(56) References Cited

U.S. PATENT DOCUMENTS

| | | | |
|---|---|---|---|
| 2011/0049885 A1* | 3/2011 | Hernandez Mascarell | 290/44 |
| 2012/0193918 A1* | 8/2012 | Mascarell et al. | 290/44 |
| 2012/0237346 A1* | 9/2012 | Mascarell et al. | 416/1 |
| 2012/0257967 A1* | 10/2012 | Egedal et al. | 416/1 |
| 2013/0001945 A1* | 1/2013 | Hernandez Mascarell et al. | 290/44 |

* cited by examiner

*Primary Examiner* — Javaid Nasri
(74) *Attorney, Agent, or Firm* — Ladas & Parry LLP

(57) ABSTRACT

Wind turbine comprising: a tower (13) and a nacelle (21) housing a generator (19) driven by a wind rotor; measuring devices of at least wind speed V, generator speed $\Omega$, pitch angle $\theta i$ of each blade, power P, wind turbine accelerations in two perpendicular directions Ax, Ay, yaw angle Yw; azimuth position of the wind rotor AZ in which the control system connected to said measuring devices and to at least pitch and torque control actuators is also arranged for performing an active pitch angle regulation when the wind turbine is in an idling situation above $V_{out}$ changing the pitch angle $\theta i$ of each blade for minimizing the wind turbine vibrations depending at least on the measured values of wind speed V, wind turbine accelerations Ax, Ay in two perpendicular directions, yaw angle Yw, azimuth position of the wind rotor AZ and pitch angle $\theta i$ of each blade.

14 Claims, 3 Drawing Sheets

WIND TURBINE HAVING AN ACTIVE PITCH ANGLE CONTROL DURING AN IDLING SITUATION

FIELD OF THE INVENTION

The invention relates to systems and methods for minimizing vibrations in wind turbines in an idling situation at a wind speed above the cut-out wind speed.

BACKGROUND

During an idling situation, i.e. a situation where there is no power production, wind turbines usually have a fixed pitch position, depending on the wind speed, which is maintained constant for a constant wind speed.

Typically said pitch position is around 70° for low wind speeds and close to 90° for high wind speeds, for allowing a slow rotor rotation which helps for the lubrication of the drivetrain, specially the gearbox.

In idling situations above the cut-out wind speed $V_{out}$ which determines the stop of the power production, a position of the blades close to the feather position involves large loads in the wind turbine, especially in the blades and/or the tower. These large loads can have an important unsteady component, which can contribute significantly to fatigue and/or extreme loads.

In some critical wind farm sites, the long-term wind distribution (usually defined with a Weibull probability distribution) causes that the wind turbine is in an idling situation above $V_{out}$ during an important part of its lifetime. In that case the loads provoked in those idling situations can contribute importantly to the overall loads level of the turbine.

For instance, in those wind farms with a Weibull shape factor k close to 3 the wind turbine is in an idling situation above $V_{out}$ during a lot of time making, in that case, the lateral fatigue load $M_x$ in the tower even larger than the longitudinal component $M_y$. This is certainly unusual, since the longitudinal component $M_y$ of the tower fatigue load is usually larger than the lateral component $M_x$ in most of wind farms.

The present invention focuses on finding a solution for these drawbacks.

SUMMARY OF THE INVENTION

It is an object of the present invention to provide a wind turbine having a control system that allows that the wind turbine can be in an idling situation above $V_{out}$ minimizing the overall wind turbine loads.

It is another object of the present invention to provide a wind turbine having a control system that allows that the wind turbine can be in an idling situation above $V_{out}$ minimizing the wind turbine vibrations.

These and another objects are met by a wind turbine comprising: a tower and a nacelle housing a generator driven by a wind rotor formed by a rotor hub and at least one blade; measuring devices of at least wind speed V, generator speed $\Omega$, pitch angle $\theta i$ of each blade, power P, wind turbine accelerations in two perpendicular directions Ax, Ay, yaw angle Yw; azimuth position of the wind rotor AZ; a control system connected to said measuring devices and to at least pitch and torque control actuators, the control system being arranged for performing a regulation of the wind turbine according to a predetermined power curve for wind speeds below the cut-out wind speed $V_{out}$; the control system being also arranged for performing an active pitch angle regulation when the wind turbine is in an idling situation above $V_{out}$ changing the pitch angle $\theta i$ of each blade for minimizing the wind turbine vibrations depending at least on the measured values of wind speed V, wind turbine accelerations in two perpendicular directions Ax, Ay, yaw angle Yw, azimuth position of the wind rotor AZ and pitch angle $\theta i$ of each blade.

In an embodiment for a three-blades wind turbine the control system arrangement for performing said active pitch angle regulation comprises a module for obtaining the pitch angle references $\theta_{ref1}$, $\theta_{ref2}$, $\theta_{ref3}$ to be provided to the pitch actuators of the blades having: a first sub-module for calculating a first gain $\Delta_1$, common for all the blades, depending on the measured wind speed $V_{meas}$ and the wind turbine measured accelerations $Ax_{meas}$, $Ay_{meas}$; a second sub-module for calculating a second gain $\Delta_2$, individually for each blade, depending on the first gain $\Delta_1$, the measured azimuth position of the wind rotor $AZ_{meas}$ and the measured yaw angle $Yw_{meas}$; a third sub-module for calculating a third gain $\Delta_3$, individually for each blade, depending on the second gain $\Delta_2$, the measured generator speed $\Omega_{meas}$ and the average pitch angle $\theta_{mean}$; and a fourth sub-module (81) for obtaining the individual pitch angle references $\theta_{ref1}$, $\theta_{ref2}$, $\theta_{ref3}$, depending on the third gain $\Delta_3$ and the collective pitch angle reference $\theta_{ref}$. Hereby it is achieved a control system able for setting dynamic pitch references for each blade for reducing the wind turbine vibrations.

In preferred embodiments the wind turbine measured accelerations $Ax_{meas}$, $AY_{meas}$ are measured at the nacelle or at the tower in two horizontal perpendicular directions or are obtained combining both measures. The measured yaw angle $Yw_{meas}$ may be additionally taken into account for adjusting said measures. Hereby there are provided several alternatives for the measurement of wind turbine accelerations for adapting the active pitch angle regulation to particular needs.

Other features and advantages of the present invention will be understood from the following detailed description of illustrative and by no means limiting embodiments of its object in relation with the enclosed drawings.

DETAILED DESCRIPTION OF PREFERRED EMBODIMENTS

Figure 1:
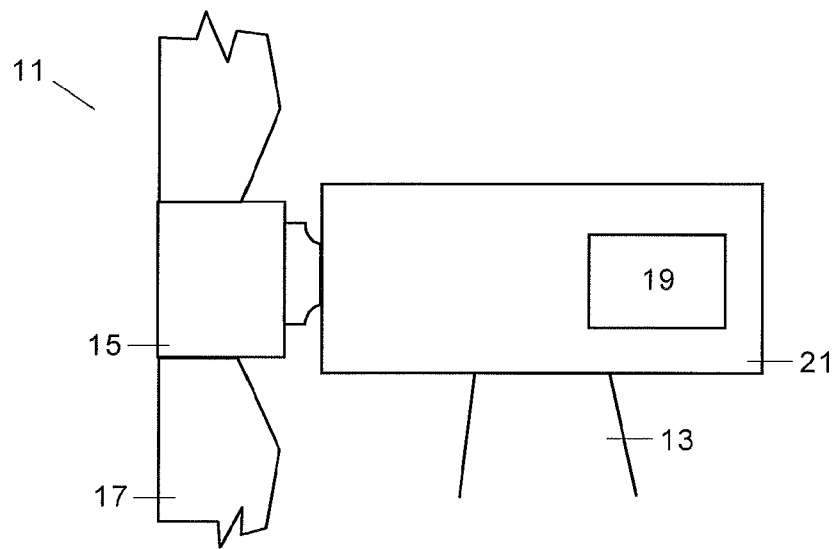
FIG. 1 is a schematic section side view of a wind turbine.

A typical wind turbine 11 comprises a tower 13 supporting a nacelle 21 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The wind turbine power output is typically controlled by means of a control system for regulating the pitch angle of the rotor blades and the generator torque. The rotor rotational speed and power output of the wind turbine can hereby be initially controlled.

Figure 2:
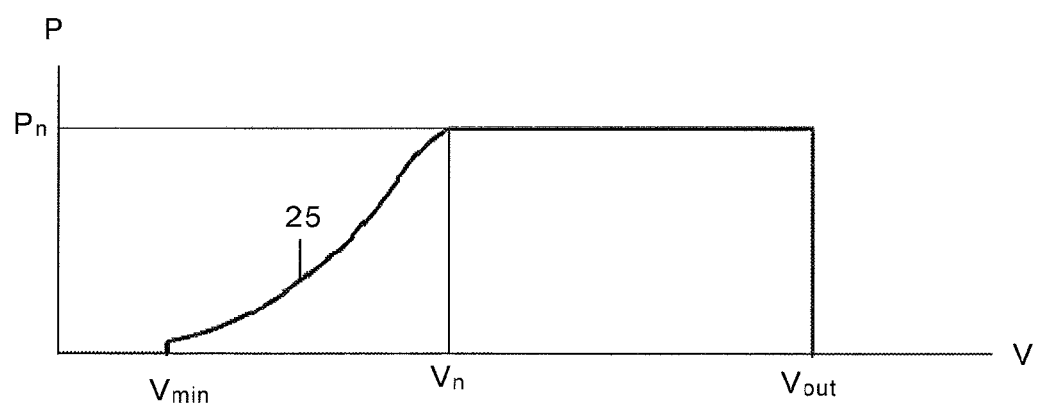
FIG. 2 shows a typical power curve of a wind turbine.

Below the cut-out wind speed $V_{out}$ the wind turbine control system is arranged to regulate the power production according to a curve which defines the desired functional relationship between power and speed to achieve ideal output. A curve of this type is curve 25 in FIG. 2 showing that the power production P increases from a minimum wind speed $V_{min}$ to the nominal wind speed $V_n$ and then remain constant in the nominal power value $P_n$ up to the cut-out wind speed $V_{out}$ where decreases up to 0.

For implementing said regulation a control unit receives input data such as wind speed V, generator speed Ω, pitch angle θ, power P from well known measuring devices and send output data $θ_{ref}$, $T_{ref}$ to, respectively, the pitch actuator system for changing the angular position of the blades 17 and to a generator command unit for changing the reference for the power production.

According to the present invention the control system is also arranged for applying an active pitch angle control in an idling situation with wind speeds V above the cut-out wind speed $V_{out}$.

Figure 3:
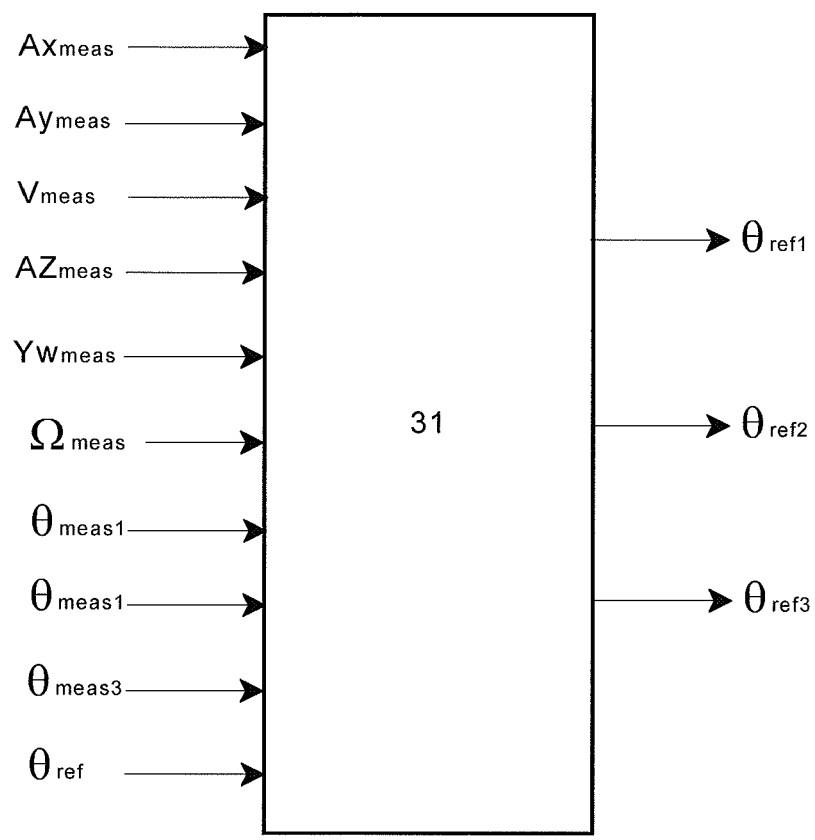
FIG. 3 is a schematic block diagram of the active pitch angle control according to a preferred embodiment of the present invention and FIG. 4 is a detailed block diagram of one preferred embodiment.

As shown in FIG. 3 for the case of a wind turbine of three blades the basic inputs to the control unit 31 that implements said active pitch control during an idling situation are the following ones: the measured wind speed $V_{meas}$, the three measured blade pitch angles $θ_{meas1}$, $θ_{meas2}$, $θ_{meas3}$, the collective pitch angle reference $θ_{ref}$ generated by the main wind turbine controller, the measured values of the wind turbine accelerations $AX_{meas}$, $Ay_{meas}$, the measured value of the generator speed $Ω_{meas}$, the measured value of the azimuth position of the wind rotor $AZ_{meas}$ and the measured value of the yaw angle $Yw_{meas}$. The outputs are the individual pitch angle references $θ_{ref1}$, $θ_{ref2}$, $θ_{ref3}$ to be provided to the pitch actuator systems.

The measured values of the azimuth position of the wind rotor $AZ_{meas}$ and the measured value of the yaw angle $Yw_{meas}$ are obtained by means of any suitable angular position sensor, for example, an inductive non-contact position sensor or a rotary encoder.

In one embodiment the measured values of the wind turbine accelerations $Ax_{meas}$, $Ay_{meas}$ are wind turbine accelerations measured at the nacelle 21 in two horizontal perpendicular directions (being for instance the North-South/East-West directions) using accelerometers suitably placed.

In another embodiment the measured values of the wind turbine accelerations $AX_{meas}$, $Ay_{meas}$ are wind turbine accelerations measured at the tower 13 (at any height) in two horizontal perpendicular directions (being for instance the North-South/East-West directions) by using accelerometers suitably placed.

In another embodiment the measured values of the wind turbine accelerations $AX_{meas}$, $Ay_{meas}$ are obtained composing the wind turbine accelerations measured at the nacelle 21 and at the tower 13.

In the above mentioned three cases the measured yaw angle $Yw_{meas}$ can be also taken into account.

Said control unit 31 comprises a module implementing a suitable algorithm for determining the individual pitch angle references $θ_{ref1}$, $θ_{ref2}$, $θ_{ref3}$ that minimizes the wind turbine vibrations for each set of said input variables.

Figure 4:
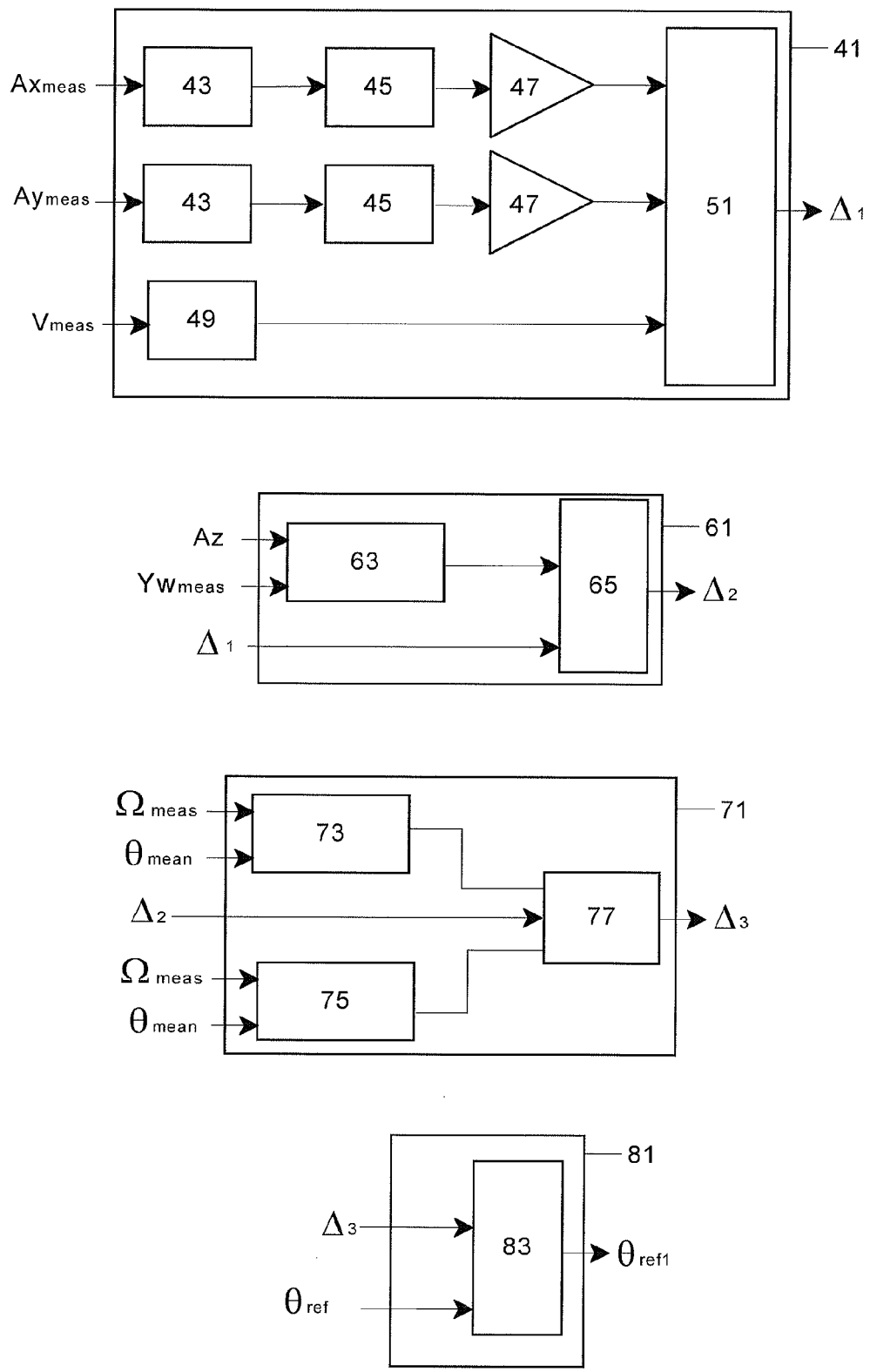

In a preferred embodiment (for wind turbine accelerations measured at the nacelle 21 or at the tower 13) said algorithm is implemented by means of the sub-modules 41, 61, 71 and 81 shown in FIG. 4.

In sub-module 41 a first gain $Δ_1$, common for all the blades, is obtained from the measured wind speed $V_{meas}$ and wind turbine measured accelerations $AX_{meas}$, $Ay_{meas}$.

The signals of the measured accelerations $Ax_{meas}$, $Ay_{meas}$ (indicative of the vibrations occurring in the wind turbine) are Low Pass filtered in blocks 43 and converted to speed signals Vtx, Vty through an integrator algorithm (blocks 45) and an appropriate gain constant (blocks 47). In block 51 is obtained the first gain $Δ_1$ through a Direct Velocity Feedback algorithm that feedbacks the speed signals Vtx, Vty with a limited gain for the control pitch system. In block 51 it is also added a contribution proportional to the measured wind speed $V_{meas}$ obtained in block 49. By adding this contribution a damping is added to the vibrations along the measurement directions. The first gain $Δ_1$ is also made wind speed dependant with the purpose of making the gain larger or smaller depending on the wind speed, helping, thus, to activate or deactivate the active pitch angle control below or above certain wind speed.

In sub-module 61 a second gain $Δ_2$ is obtained, individually for each blade, depending on the first gain $Δ_1$, the measured rotor azimuth position $AZ_{meas}$ and the measured yaw angle $Yw_{meas}$. In FIG. 4 are only shown the sub-modules 61, 71, 81 for one blade.

A specific gain, depending on the measured rotor azimuth position $AZ_{meas}$ and the measured yaw angle $Yw_{meas}$, is calculated in block 63 and is multiplied in block 65 by the first gain $Δ_1$ for obtaining the second gain $Δ_2$.

In sub-module 71 a third gain $Δ_3$ is obtained, individually for each blade, depending on the second gain $Δ_2$, the measured generator speed $Ω_{meas}$ and the average pitch angle $θ_{mean}$ (which is obtained from the three measured blade pitch angles $θ_{meas1}$, $θ_{meas2}$, $θ_{meas3}$). An uncontrolled actuation over the control pitch system during idling state could lead to excessive rotor speeds, which could be potentially hazardous for the wind turbine integrity. Then, in order to avoid excessive rotor speeds during idling, the second gain $Δ_2$ is limited (saturated) in block 77 to some upper and lower limits (saturation limits) obtained in blocks 73, 75 depending on measured generator speed $Ω_{meas}$ and the average pitch angle $θ_{mean}$.

Finally in sub-module 81, the final pitch angle reference $θ_{ref1}$ for the blade 1 is calculated in block 83 by adding up the collective pitch angle $θ_{ref}$ to the third gain $Δ_3$.

For embodiments using more than one measurement of the wind turbine acceleration in two horizontal perpendicular directions the sub-module 41 will have additional blocks (not shown) for implementing the corresponding composition in view of the trigonometric relations between nacelle 21 and tower 13 position with the yaw angle.

By setting a dynamically pitch reference for each blade (which could also be the same for the three blades) to be added to the collective pitch reference during idling, the wind turbine vibrations are minimized, particularly the vibrations due to the horizontal load on the tower, which is the source of the tower vibrations during idling state that increases the fatigue load in some cases.

As the wind turbine does not produce any power in an idling situation, the power required for performing said active pitch angle control shall be provided whether by a backup power source available at the wind turbine such as an Uninterruptable Power Supply (UPS) device or by an electrical network to which the wind turbine is connected.

Although the present invention has been fully described in connection with preferred embodiments, it is evident that modifications may be introduced within the scope thereof, not considering this as limited by these embodiments, but by the contents of the following claims.

The invention claimed is:

1. Wind turbine comprising:
    a tower (13) and a nacelle (21) housing a generator (19) driven by a wind rotor formed by a rotor hub (15) and at least one blade (17);
    measuring devices of at least wind speed V, generator speed Ω, pitch angle θi of each blade, power P, wind turbine accelerations in two perpendicular directions Ax, Ay, yaw angle Yw, azimuth position of the wind rotor AZ;

a control system connected to said measuring devices and to at least pitch and torque control actuators, the control system being arranged for performing a regulation of the wind turbine according to a predetermined power curve (25) for wind speeds below the cut-out wind speed $V_{out}$;

characterized in that the control system is also arranged for performing an active pitch angle regulation when the wind turbine is in an idling situation above $V_{out}$ changing the pitch angle $\theta i$ of each blade for minimizing the wind turbine vibrations depending at least on the measured values of wind speed V, wind turbine accelerations in two perpendicular directions Ax, Ay, yaw angle Yw, azimuth position of the wind rotor AZ and pitch angle $\theta i$ of each blade.

2. Wind turbine according to claim 1, wherein the control system arrangement for performing said active pitch angle regulation for a three-blades wind turbine comprises a module for obtaining the pitch angle references $\theta_{ref1}$, $\theta_{ref2}$, $\theta_{ref3}$ to be provided to the pitch actuators of the blades having:

a first sub-module (41) for calculating a first gain $\Delta_1$, common for all the blades, depending on the measured wind speed $V_{meas}$ and the wind turbine measured accelerations $Ax_{meas}$, $Ay_{meas}$;

a second sub-module (61) for calculating a second gain $\Delta_2$, individually for each blade, depending on the first gain $\Delta_1$, the measured azimuth position of the wind rotor $AZ_{meas}$ and the measured yaw angle $Yw_{meas}$;

a third sub-module (71) for calculating a third gain $\Delta_3$, individually for each blade, depending on the second gain $\Delta_2$, the measured generator speed $\Omega_{meas}$ and the average pitch angle $\theta_{mean}$; and a fourth sub-module (81) for obtaining the individual pitch angle references $\theta_{ref1}$, $\theta_{ref2}$, $\theta_{ref3}$, depending on the third gain $\Delta_3$ and the collective pitch angle reference $\theta_{ref}$.

3. Wind turbine according to claim 2, wherein said wind turbine measured accelerations $Ax_{meas}$, $Ay_{meas}$ are measured at the nacelle (21) in two horizontal perpendicular directions.

4. Wind turbine according to claim 2, wherein said wind turbine measured accelerations $Ax_{meas}$, $Ay_{meas}$ are measured at the tower (13) in two horizontal perpendicular directions.

5. Wind turbine according to claim 2, wherein said wind turbine measured accelerations $Ax_{meas}$, $Ay_{meas}$ are the result of a trigonometric composition of the wind turbine accelerations measured at the nacelle (21) and at the tower (13) in two horizontal perpendicular directions.

6. Wind turbine according to claim 2, wherein said wind turbine measured accelerations $Ax_{meas}$, $Ay_{meas}$ are modified taking into account the measured yaw angle $Yw_{meas}$.

7. Wind turbine according claim 2, wherein the wind turbine also comprises an Uninterruptable Power Supply device for supplying power to the pitch actuator system in said idling situation.

8. Wind turbine according to claim 2, wherein the power supplied to the pitch actuator system in said idling situation is provided by an electrical network to which the wind turbine is connected.

9. Wind turbine according to claim 1, wherein said wind turbine measured accelerations $Ax_{meas}$, $Ay_{meas}$ are measured at the nacelle (21) in two horizontal perpendicular directions.

10. Wind turbine according to claim 9, wherein said wind turbine measured accelerations $Ax_{meas}$, $Ay_{meas}$ are modified taking into account the measured yaw angle $Yw_{meas}$.

11. Wind turbine according to claim 1, wherein said wind turbine measured accelerations $Ax_{meas}$, $Ay_{meas}$ are measured at the tower (13) in two horizontal perpendicular directions.

12. Wind turbine according to claim 1, wherein said wind turbine measured accelerations $Ax_{meas}$, $Ay_{meas}$ are the result of a trigonometric composition of the wind turbine accelerations measured at the nacelle (21) and at the tower (13) in two horizontal perpendicular directions.

13. Wind turbine according to claim 1, wherein the wind turbine also comprises an Uninterruptable Power Supply device for supplying power to the pitch actuator system in said idling situation.

14. Wind turbine according to claim 1, wherein the power supplied to the pitch actuator system in said idling situation is provided by an electrical network to which the wind turbine is connected.

* * * * *